Aug. 16, 1938.    F. J. GAMMACHE    2,126,879
GRINDER
Filed May 5, 1936
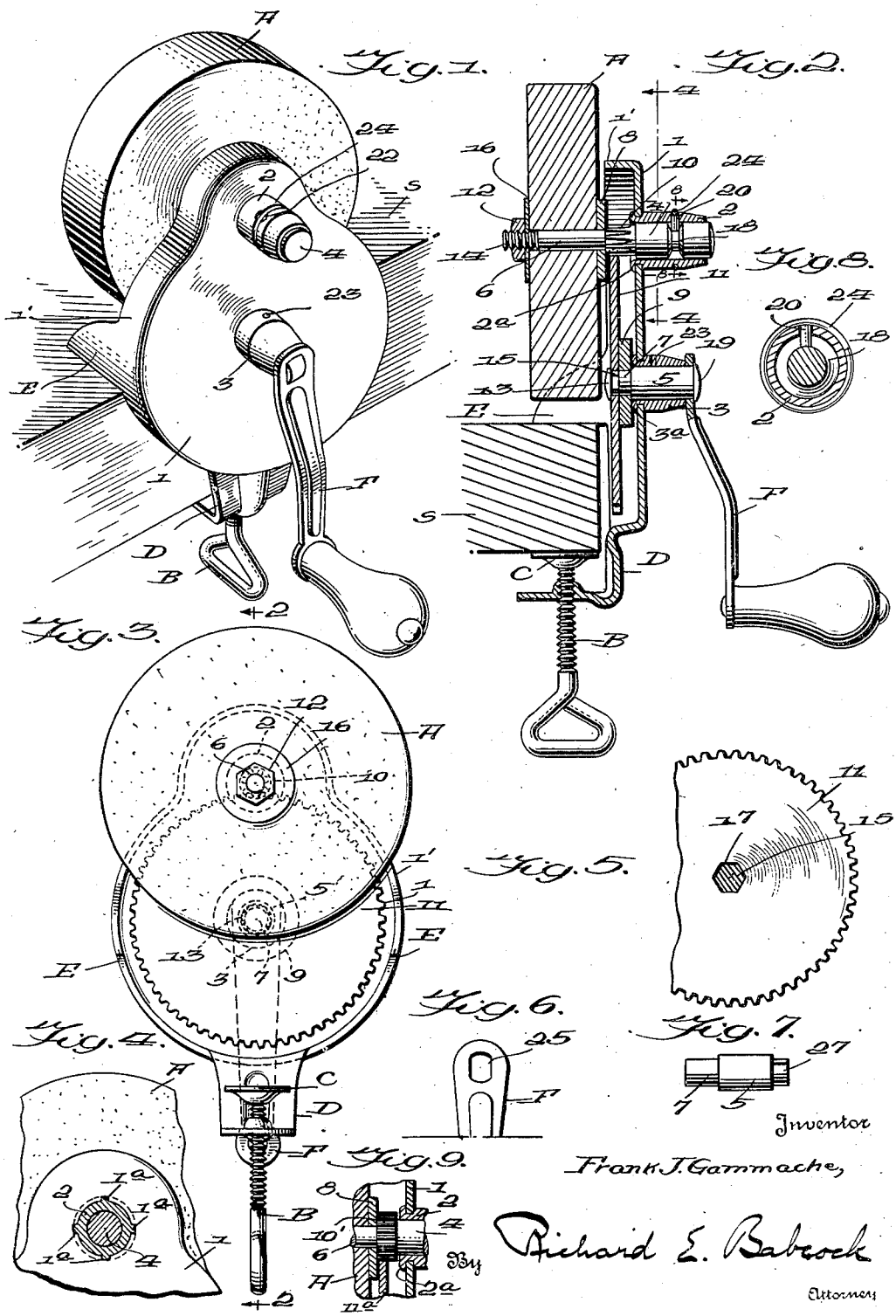
Inventor
Frank J. Gammache,
By Richard E. Babcock
Attorney Patented Aug. 16, 1938

2,126,879

UNITED STATES PATENT OFFICE 2,126,879

GRINDER

Frank J. Gammache, Lancaster, Pa.

Application May 5, 1936, Serial No. 78,018

6 Claims. (Cl. 51—166)

This invention relates to grinders of the gear driven portable type.

The primary purpose of this invention is to provide a mechanically practical highly efficient gear driven grinder for ordinary household or domestic and office and small shop use which will be durable and stand up under lengthy and hard use and which may be manufactured in large quantities by mass production methods so economically, due to its construction and to the special combination and relationship of its parts, that without any sacrifice of the manufacturer's normal profits it may be sold at retail for an extremely low price, a few cents, without involving any sacrifice of normal sales profits on the grinders sold by the retailer.

Subsidiary objects contributing to the accomplishment of the primary purpose are, to provide a special combination of sheet metal frame or casing, capable of production from sheet steel by suitable sheet metal stamping operations, with suitable long thin tubular bearings to support the drive and driven shafts, said tubular bearings or bearing sleeves having their inner ends riveted into perforations in the casing similar to hollow rivets and in the process being so associated with the casing as to be rigid therewith against axial and rocking movement and preferably against any possible relative turning movement; to provide separate inserted sleeve bearings for affording long bearings for supporting the driving and driven shafts practically entirely on one side of the frame, casing, bracket or stand, whereby a material, as for instance sheet steel, particularly suitable for the latter, and a material, for instance bronze, particularly suitable for the bearing sleeves may be used in association, so retaining the desirable attributes of both materials for their special functions in a rigid very simple combination structure without sacrificing economy of manufacture; to provide simple, efficient and reliable means for releasably locking the driven shaft in its bearing and supporting sleeve for rotation; to provide means for holding said lock in place independently of direct engagement thereby with the cooperating bearing sleeve whereby it is made practical to use a thin-wall tubular bearing sleeve and thus economize on the amount of metal bearing material used without any sacrifice of efficiency; to provide a special simple combination of driven shaft, grinding wheel and clamping means for the latter; and to provide as an easily and quickly removable and replaceable or reinsertable assembled operative unit a driven shaft with its driven pinion and the grinding wheel or other operative tool or element clamped on or secured to said shaft to rotate therewith.

In this application I show and describe only the present preferred embodiment of my invention simply by way of illustration of the practice of my invention, as by law required. However, it is to be understood that my invention is capable of other and different embodiments, and that the several details thereof may be modified in various ways all without departing from my said invention. Therefore, the drawing and description herein are to be considered as merely illustrative and not as exclusive.

In the accompanying drawing:

Figure 1 represents a perspective view of a portable gear driven grinder embodying my invention as clamped or mounted on a shelf or table or bench edge portion;

Figure 2, a sectional view on the line 2—2 of Figure 3, looking in the direction of the arrows;

Figure 3, a rear elevation of the grinder, removed from the supporting shelf, bench or table S;

Figure 4, a fragmentary detail sectional view on the line 4—4 of Fig. 2, looking in the direction of the arrows, illustrating the notches 1ª formed in the edge or wall of the perforation receiving the bearing sleeve 2 and filled by the metal of the bronze bearing sleeve 2 extruded or flowed into said notches during the riveting operation as illustrating the preferred construction for positively preventing relative rotary movement on the bearing sleeves 2 and 3, the construction illustrated in Figure 4 being employed also as to bearing sleeve 3 of the drive shaft;

Figure 5, a fragmentary detail view of the drive gear 11 with the angular cross-sectional portion 15 of the drive shaft shown in cross-section as making a tight driving fit in the correspondingly shaped angular central or hub opening 17 of said gear 11;

Figure 6, a fragmentary detail front elevation of the handle F with its elongated perforation to fit upon the correspondingly shaped portion 27 of the drive shaft;

Figure 7, an elevation of the drive shaft prior to being operated upon during the assembly operations;

Figure 8, an enlarged detail sectional view on the line 8—8 of Figure 2, looking in the direction of the arrows; and Figure 9, a fragmentary detail sectional view of a modified form.

Referring now in detail to the drawing, A designates the grinding wheel which may be of any suitable abrasive material or may be substituted by a polishing or buffing or other wheel and may be of any form or construction such as a radial face grinder instead of the peripheral face grinder shown; B designates the usual clamping screw B having screw-thread engagement with a depending lug or finger D of the frame, stand, bracket or support 1 and provided with the usual swiveled broad clamping foot C to, in cooperation with the opposed edges of the flanges or arms E, clamp the grinder securely in position on the edge portion of a supporting shelf or table or bench S; and F designates a suitable operating crank handle rigidly connected to the outer end of the drive shaft 5.

The frame or supporting standard, bracket or casing 1 is preferably formed up by suitable known sheet metal stamping operations from sheet steel with a large plane or vertical portion to support the bearing sleeves 2 and 3 in which are rotatably mounted the driven shaft 4 and the drive shaft 5 respectively. Preferably the frame or casing is formed with an integral rearwardly directed edge flange of substantial length to give increased rigidity to the frame as a whole and also to provide a protective recessed housing for the gears and to give a more pleasing appearance to the grinder as a finished article. However, such edge flange is not essential and may be dispensed with though in such case it will be desirable to employ a thicker or heavier weight sheet metal stock from which to form the frame than would be necessary were the edge flange provided in order to obtain the same rigidity of the frame.

A depending clamping finger D extends from the lower portion of the frame 1 and is bent rearwardly to a substantially horizontal position and formed with a screw-threaded bore or perforation in which works a clamping screw B having a cupped disc-form presser foot C swiveled on its upper end as usual in connection with such clamping screws, said foot C engaging the lower face of the edge portion of a support S in opposition to the lower edges of the clamping flanges or arms E rigid with the frame 1 and which engage the upper face of the edge portion of said support S. Preferably the clamping finger D and the clamping flanges or arms E will be integral with frame 1 and where the rearwardly extending edge flange 1' is provided preferably the clamping finger D will be integral with and depend from the lower rear edge portion of said flange 1' and the clamping flanges or arms E will be integral with and extend rearwardly as continuations of the flange 1' in the same axial plane with each other on opposite sides of the drive shaft 5 preferably closely adjacent to the latter.

The frame or casing 1 is formed with two perforations of generally circular form, the edge wall of each of said perforations being interrupted by shallow notches 1a preferably angular and preferably quite shallow in a radial direction, say extending radially outward from the normal circular edge wall for about five thousandths of an inch, their function being to make a non-circular or irregular surface into which the metal of the respective sleeve bearings 2 and 3 will flow under the compression incident to their association with the frame 1 and so positively interlock therewith to prevent rotary movement of either of said bearing sleeves. Any form of notches or variation in number of notches or interruptions or construction of the edge or wall of the opening that will serve this function may be substituted for the construction illustrated.

Bearing bushings having rear end shoulders extending substantially perpendicular to their respective axes are formed with relatively thin walled reduced external diameter rearwardly extending riveting extensions or portions of such external diameter as to respectively make a snug fit in the respective perforations in the casing 1, the driven shaft bearing sleeve 2 being inserted in the upper perforation and the drive shaft bearing 3 being inserted in the lower perforation. When thus positioned in their corresponding perforations dies are applied under heavy pressure to the respective ends of the respective bearing sleeves 2 and 3 to force their perpendicular shoulders firmly, tightly and squarely against the outer or front face of the frame 1 and at the same time spread and rivet over as at 2a and 3a respectively the inner end portions of their reduced riveting extensions against the rear face of the frame 1 over and about the edge of the respective cooperating perforations in the latter, such heavy degree of pressure being employed as will cause the metal of such riveting extensions to flow into and fill the notches 1a and to firmly and rigidly hold the respective bearing sleeves 2 and 3 in fixed mounted position in the frame 1 against relative movement in any direction to all practical purposes the same as though integral therewith.

The bearing sleeves 2 and 3 will preferably be of bronze as having specially desirable bearing attributes or properties and will be of a length at least equal to, and preferably in excess of, the diameter of that portion of the respective shafts respectively supported thereby, the upper bearing sleeve 2 for the driven shaft 4 preferably being longer than the lower bearing sleeve 3 for the drive shaft 5 to provide room for the locking means for the driven shaft and to compensate for the greater load on or length of the driven shaft, while the walls of said bearing sleeves 2 and 3 will be only of such degree of thickness as is necessary to obtain a rigid supporting bearing in order that the expense for metal used may be kept to a minimum.

Preferably the bearing sleeve 3 is formed with a radial lubricating or oil hole 23 and the bearing 2 is formed with a similar hole 22 for the dual purposes of lubrication and of receiving the locking pin 20 which is dropped into said hole 22 and extends down into the annular groove 18 in the driven shaft 4 to prevent axial movement of said shaft 4 such as would permit its withdrawal from the bearing 2 while permitting rotary movement of said shaft 4 in its bearing 2. Said locking pin is disposed loosely in said oil hole 22 and is prevented from accidentally being displaced or dropping out by a retaining element or band 24, which will preferably be a resilient split ring and which will preferably be disposed in an annular groove in the radial plane of the hole 22 as illustrated in Figures 1 and 2.

This feature of the loose locking pin avoids the need of using a relatively thick walled bearing sleeve for the driven shaft such as otherwise would be necessary if a locking screw having screw-thread engagement with the bearing sleeve or in the bearing sleeve were employed while also permitting the hole 22 to serve the dual functions of simultaneously receiving oil for lubricating purposes while retaining te locking pin 20 in operative position locking the shaft 4 against axial movement.

The drive shaft 5 is formed with a long large diameter portion received in the bearing sleeve 3, a reduced relatively long rear extension portion 7 and a short front extension 27 of preferably elongated angular cross-section corresponding in shape to, and received in, the elongated opening 25, see Fig. 6, in the end of handle or crank lever F.

To assemble the drive shaft and parts carried thereby in operative position, the shaft 5 is disposed in the bearing sleeve 3, a thick spacing washer 9 is threaded or slipped over the free or rear end of extension 7 and pressed against the end shoulder of the larger diameter or main portion of shaft 5 and substantially in light rubbing contact with, or closely adjacent to but slightly spaced from, the adjacent face of the inner or rear face of riveted portion 3a of the inner end of the bearing sleeve 3, the large drive gear wheel 11 has its angular central opening or hub 17 then threaded or slipped similarly over the inner or rear end of the reduced portion 7 and is moved over into firm full contact with the opposed face of the washer 9. Thereafter the socket 25 of handle F is applied to the front extension 27, and both extensions 7 and 27 then have their extreme end portions upset or riveted over under heavy pressure to spread them to hold the crank lever F firmly on the front end of shaft 5 and to cause the metal mass of the rear end of rear extension 7 to spread radially and assume or take on a cross-section corresponding, or substantially corresponding, to the shape defined by the edge or wall of the opening 17 for that portion 15 of the length of said extension 7 disposed between the front and rear faces of the drive gear 11 whereby said gear 11 will be positively and rigidly locked to the shaft 5 to turn therewith, the extreme rear end 13 of said extension 7 being spread radially to engage the rear face of said gear 11 and positively hold the same against axial separation. Of course the washer 9 and gear 11 may be disposed on the extension 7 and the riveting operation performed on the extension 7 and thereafter the shaft 5 be inserted in its bearing sleeve 3 and the handle F then applied, or the handle may be applied first, the order of assembly being largely immaterial, it being noted that when the assembly operations as to the mounting of the shaft 5 in its bearing sleeve 3 and the connecting thereto of the drive gear 11 and handle or crank lever F are completed the shaft 5 is permanently held in its bearing 3 against separation or removal therefrom without destructive mutilation.

The driven shaft 6 is formed with a relatively long large diameter portion 4 interrupted by the annular locking groove 18, the portions preferably being substantially of equal length. Adjacent the rear end of such large diameter portion 4 the shaft is very slightly reduced in diameter and this reduced portion is formed into a driven pinion 10 by a suitable gear cutting or grinding automatic machine, a long further reduced portion 6 extending from the rear end of the pinion 10 and having its rear end portion externally screw-threaded as at 14.

The reduction of the diameter of that portion of the shaft from which the pinion 10 is generated prevents the possible wire edges or rough burs that might be turned up at the front end of the gear or pinion teeth or pinion 10 from doing injury to the sleeve bearing 2, since they will not extend radially sufficiently to engage the opposed face of the bearing sleeve 2.

To assemble the driven shaft 4 with its grinding or buffing wheel A or other rotary tool, the relatively thick clamping washer 8 is threaded or slipped over the rear screw-threaded end portion 14 of the driven shaft and along the clamping stem portion 6 until it abuts squarely against the rear end of pinion 10, the opening in the washer 8 being just sufficiently large to snugly receive the cross-section of said portion 6. Thereafter the wheel or tool A is slipped over the rear end of, and lengthwise of, the portion 6, next the relatively thin rear clamping washer 16 is similarly applied to the portion 6 and finally the clamping nut 12 is applied to the portion 14 and turned up tight thereon to firmly clamp the wheel or tool A between the clamping washers or plates 8 and 16 to turn therewith with the pinion 10 as driven by the large drive gear 11.

In the embodiment illustrated before assembling the driven shaft 4 with the wheel A, assuming the drive shaft 5 with its drive gear 11 to have already been permanently mounted in the stand or casing 1, it is necessary to insert the shaft 4 in its bearing 2 by threading it, with its threaded portion 14 to the rear, in a direction from front to rear through said bearing until the large diameter portion of the driven shaft 4 is disposed in said bearing 2, since such large diameter portion is of greater diameter than the pinion 10 and if attempt were made to move such large diameter portion of driven shaft 4 in an axial direction toward or from the rear to remove it from or insert it into its bearing 2 such attempt would be blocked by the fact that the large diameter portion of the driven shaft 4 must move in a straight axial line in moving into or from its bearing 2 and such straight line movement is impossible due to the interference of the drive gear 11. However, if, as illustrated in Figure 9, the driven pinion 10' were made substantially larger and the drive gear 11a were made smaller so that while the two would properly mesh to drive the former from the latter, yet the gear 11a would not extend radially sufficiently to overlie the interior of the bearing sleeve 2 or to intersect an imaginary rearward extension of the tubular cross-section thereof and so would not lie in the path of axial movement of the portion of driven shaft 4 received in and supported by said bearing sleeve 2, then the assembled unit of the grinding wheel A with the driven shaft as a single operative unit might be removed and reinserted or interchanged as an assembled unit by releasing the locking pin 20 to permit this to be done but without need to disturb any other part of the grinder, and I consider it within the scope of my invention to modify the parts immediately above described in the manner as immediately above stated for the purpose specified. However, it is to be noted that this would involve slight added cost of manufacture due to the need to employ larger diameter stock for the driven shaft 4 in order to have the larger diameter pinion and to this extent would tend to decrease the primary objective of extreme economy of manufacture and also would result in a variation of the gear ratio with a slowing up in the speed of rotation of the grinding wheel and having the foregoing considerations in mind the embodiment illustrated in Fig. 2 is preferred although the modifications suggested are in mind and considered within the scope of my invention.

The drive gear 11 may be formed or produced in any suitable manner but I have found in actual practice that it is practical and most economical to produce such gear wheel 11 by a single sheet metal stamping operation, the central opening or hub 17 and the gear teeth all being formed in the single stamping operation by which the gear is cut from the usual large sheet of sheet metal stock, in this instance preferably sheet steel, and thus far I have produced a number of thousands of these grinders with the drive gear 11 of each stamped out in this manner.

The first seven views of the drawing are made to exact full size scale from one of the actual commercial physical embodiments of the grinder as selected at random from the shipping room, with the exception that inadvertently the draftsman has made the gear 11 slightly larger than it actually is, though hardly more than infinitesimally so.

I claim:

1. A grinder comprising a sheet metal frame formed with two general circular perforations the wall of each of which is formed with at least one notch, said frame having an integral bracing marginal flange and being provided with integral rearwardly extending clamping arms, and means for clamping the lower faces of said arms against a support, in combination with a driven shaft bearing mounted in one of said perforations, a drive shaft bearing mounted in the other perforation between said clamping arms with its axis in a plane closely adjacent to the common plane of the lower faces of said clamping arms, a drive shaft mounted in said drive shaft bearing, a driven shaft mounted in said driven shaft bearing, a gear mounted on said drive shaft for rotation therewith, a pinion provided on said driven shaft to turn therewith and meshing with and driven by said gear, a grinding wheel mounted on said driven shaft to the rear of said pinion to turn with said driven shaft, said driven shaft bearing being formed in the same plane with an external annular groove and a radial hole and said driven shaft being formed with an annular groove in its portion received in said driven shaft bearing, a locking pin loosely disposed in said hole and extending into said annular groove in said driven shaft, and a resilient split ring disposed in said external groove and overlying said hole and the radially outer end of said pin, each said bearing having an annular rear shoulder extending perpendicular to its axis and a reduced diameter tubular rear riveting portion extending through its corresponding perforation and having its extreme rear end portion radially spread and extending into the notch in the wall of said perforation and overlying and engaging the rear face of the adjacent portion of said frame.

2. A grinder comprising a sheet metal frame formed with two generally circular perforations, said frame being provided with rigid rearwardly extending clamping arms, and means for clamping the lower faces of said arms against a support, in combination with a driven shaft bearing mounted in one of said perforations, a drive shaft bearing mounted in the other perforation between said clamping arms with its axis closely adjacent to the common plane of the lower faces of said clamping arms, a drive shaft mounted in said drive shaft bearing, a driven shaft mounted in said driven shaft bearing, a gear mounted on said drive shaft for rotation therewith, a pinion provided on said driven shaft to turn therewith and meshing with said gear and driven thereby, a grinding wheel mounted on said driven shaft to the rear of said pinion to turn with said driven shaft, said driven shaft sleeve being formed in the same plane with an external annular groove and a radial hole and said driven shaft being formed with an annular groove in its portion received in said driven shaft bearing, a locking pin loosely disposed in said hole and extending into said annular groove in said driven shaft, and a resilient split ring disposed in said external groove and overlying said hole, each said bearing having an annular rear shoulder extending perpendicular to its axis, and a reduced diameter tubular rear riveting portion extending through its corresponding perforation and having its extreme rear end portion radially spread under pressure so as to overlie and engage the rear face of the adjacent portion of said frame.

3. A grinder comprising a sheet metal frame formed with two generally circular perforations, in combination with a driven shaft bearing mounted in one of said perforations, a drive shaft bearing mounted in the other perforation, a drive shaft mounted in said drive shaft bearing, a driven shaft mounted in said driven shaft bearing, a gear mounted on said drive shaft for rotation therewith, a pinion provided on said driven shaft to turn therewith and meshing with and driven by said gear, a grinding wheel mounted on said driven shaft to the rear of said pinion to turn with said driven shaft, said driven shaft bearing sleeve being formed with a radial hole and said driven shaft being formed with an annular groove in its portion received in said driven shaft bearing, and a locking pin loosely disposed in said hole and extending into said annular groove in said driven shaft, each said bearing having a reduced diameter tubular rear riveting portion extending through its corresponding perforation and having its extreme rear end portion radially spread so as to overlie and engage the rear face of the adjacent portion of said frame.

4. In a grinder, a frame, a bearing sleeve rigidly mounted in said frame and extending practically for its full length from one face thereof and formed with a radial hole, a pin loosely disposed in said hole and extending radially inward beyond the inner face of said bearing sleeve, and a resilient split band encircling said sleeve and overlying the outer end of said hole, in combination with a shaft having a large diameter front end portion disposed and making a snug bearing fit in said sleeve bearing, a reduced portion formed into a pinion immediately to the rear of said large diameter portion, and a further reduced diameter stem portion extending rearwardly from said pinion and having its rear end portion externally screw-threaded, a clamping plate disposed about said stem portion and bearing with its front face against the rear end of said pinion, a grinding wheel disposed about said stem portion and having its front face in engagement with said clamping plate, a washer disposed about said stem and having its front face in engagement with said wheel, and a clamping nut engaging the threaded portion of said washer and bearing against said washer to clamp the grinding wheel between said washer and plate to turn with said shaft, said large diameter portion of said shaft being formed with an annular groove releasably receiving the radially inner portion of said pin.

5. In a grinder, a frame, a bearing sleeve rigidly mounted in said frame and extending practically for its full length from one face thereof and formed with a radial hole, a pin loosely disposed in said hole and extending radially inward beyond the inner face of said bearing sleeve, and means for preventing accidental displacement of said pin, in combination with a shaft having a bearing portion disposed in said bearing sleeve, a reduced diameter stem portion, and a portion formed into a pinion between said stem and bearing portions, a plate disposed about said stem portion and bearing against the adjacent end of said pinion, a grinding wheel disposed about said stem portion, and means engaging said stem for clamping said wheel between said means and said plate to turn with said stem, said bearing portion of said shaft being formed with an annular groove releasably receiving the radially inner portion of said pin.

6. In a grinder, a frame, a bearing sleeve rigidly mounted in said frame and extending for practically its full length from one face thereof, in combination with a shaft having an end bearing portion disposed in said bearing sleeve, a reduced diameter stem portion, and an integral portion formed into a pinion between said stem and bearing portions with the teeth of said pinion extending radially beyond said stem, a plate disposed about said stem portion and bearing directly against the adjacent ends of the teeth of said pinion, a grinding wheel disposed about said stem portion, means engaging said stem for clamping said wheel between said means and said plate to turn with said stem, and means for preventing axial movement of said shaft in said bearing.

FRANK J. GAMMACHE.